United States Patent [19]

Uncles

[11] 3,950,008
[45] Apr. 13, 1976

[54] CONTROL SYSTEMS

[75] Inventor: Philip Basil Uncles, Bradford-on-Avon, England

[73] Assignee: Moulton Developments, Limited, Bradford-on-Avon, England

[22] Filed: July 2, 1975

[21] Appl. No.: 592,400

[30] Foreign Application Priority Data
July 2, 1974   United Kingdom............... 29300/74

[52] U.S. Cl. ............................ 280/124 F; 267/65 D
[51] Int. Cl.².......................................... B60G 11/26
[58] Field of Search.................... 280/124 R, 124 F; 267/65 R, 65 D

[56] References Cited
UNITED STATES PATENTS

| | | | |
|---|---|---|---|
| 2,943,851 | 7/1960 | Sampietro | 267/65 D |
| 3,584,893 | 6/1971 | Tuczek | 267/65 D |
| 3,606,375 | 9/1971 | Jackson | 267/65 D |
| 3,666,286 | 5/1972 | Engfer | 267/65 D |
| 3,704,895 | 12/1972 | Remaud | 267/65 D |
| 3,729,211 | 4/1973 | Engfer | 267/65 D |
| 3,741,582 | 6/1973 | Eckert | 267/65 D |
| 3,857,580 | 12/1974 | Keijzer | 267/65 D |
| 3,873,123 | 3/1975 | Joneleit | 267/65 D |
| 3,891,241 | 6/1975 | Bainbridge | 280/124 F |

*Primary Examiner*—Philip Goodman
*Assistant Examiner*—John A. Carroll
*Attorney, Agent, or Firm*—Shoemaker and Mattare, Ltd.

[57] ABSTRACT

The invention provides a control system consisting of a delay mechanism in conjunction with two electrical limit switches for controlling the operation of an electrical circuit in dependence upon the direction of movement of a mechanical component and the amplitude and duration of such movement. The invention is characterised in that the delay mechanism includes an elongate flexible torsion or leaf spring mounted for oscillatory movement about a pivot axis, a device for damping such oscillatory movement at the pivot axis, the leaf or torsion spring being connected directly or indirectly at a location remote from the pivot axis to the mechanical component. The electrical limit switches are located one at each side of the leaf or torsion spring at locations spaced from the pivot axis by a distance less than the distance between the pivot axis and the location where the leaf or torsion spring is directly or indirectly connected to the mechanical component.

7 Claims, 2 Drawing Figures

CONTROL SYSTEMS

This invention relates to delay mechanisms in combination with electrical limit switches for controlling the operation of an electric circuit in dependence upon the sense, amplitude or duration or direction of movement of a mechanical component.

One use of the delay mechanism according to the invention is in control systems for effecting levelling of resilient suspensions for the wheels, usually the rear wheels, of four wheeled automotive vehicles.

Levelling systems for vehicles advantageously incorporate a delay mechanism such that the levelling system does not respond to transient short-duration deflections of the wheel suspensions as the vehicle is traversing road inequalities. On the other hand the levelling system is required to respond when the spatial relationship between the sprung structure of the vehicle and its wheels changes for long durations as a consequence of loading or unloading the vehicle.

According to the present invention a delay mechanism with two electrical limit switches for controlling the operation of an electric circuit in dependence upon the sense, or direction, or amplitude of movement of a mechanical component, includes an elongate flexible element mounted for oscillatory movement about a pivot axis, a rotary damper device acting on the flexible element and arranged to damp said oscillatory motion in both clockwise and anticlockwise directions the flexible element being associated directly or indirectly with a mechanical component whose movement is to be sensed at a location spaced a predetermined distance from the pivot axis, and the electrical limit switches being so located, one on each side of the flexible element at locations spaced from the pivot axis at less than said predetermined distance that on movement of the mechanical component the flexible element is resiliently deformed so that one or other of the limit switches is operated only when movement of the mechanical component exceeds a predetermined extent, (that is for a predetermined amplitude held for a predetermined duration of time).

The flexible element may be a thin torsion spring rod connected towards one of its ends to the mechanical component and towards its other end to a rotary damper device, the rod being resiliently deformed or twisted in torsion as the mechanical component moves. The damper will resist rotational movement of the rod end to which it is connected and the rod will have in its region near the damper a radial projection arranged to engage and operate one or other of the electrical switches in dependence upon the direction in which the rod is twisted on movement of the mechanical component.

However, in a preferred arrangement, the flexible component is a metal leaf spring adapted to be resiliently deformed in bending when the mechanical component moves in one of two directions from a mean position.

When such a delay mechanism is used for controlling the operation of an electrical circuit forming part of a vehicle rear wheel suspension levelling system, the mechanism will be attached to the sprung structure of the vehicle and the spring leaf or bar will have a region remote from the pivot axis connected directly or indirectly to a movable component of the rear wheel suspension system of the vehicle. For example, it may be connected to be actuated by a wheel suspension arm, by a torsion bar extending between rear wheel suspension arms at each respective side of the vehicle, or by any other linkage, for example, an axle associated with the vehicle rear wheels.

The use of a torsion bar is preferred since by utilising such a device a component is introduced into the levelling system allowing, or compensating for, any differential between the deflections or the rear wheel suspensions at the respective sides of the vehicle at the time when the need for levelling is sensed.

In a vehicle levelling system operation one of the limit switches of the delay mechanism may be effective to bring into operation a pump which transfers fluid from a reservoir into hydraulic or pneumatic systems associated with the respective rear wheel suspensions to increase the spatial relationship between the rear wheels and the vehicle sprung structure. Operation of the second limit switch may in such a system be effective to open relief valve means to allow hydraulic fluid to return to the reservoir.

One embodiment of the invention will now be described by way of example with reference to the accompanying drawings in which.

Figure 1:
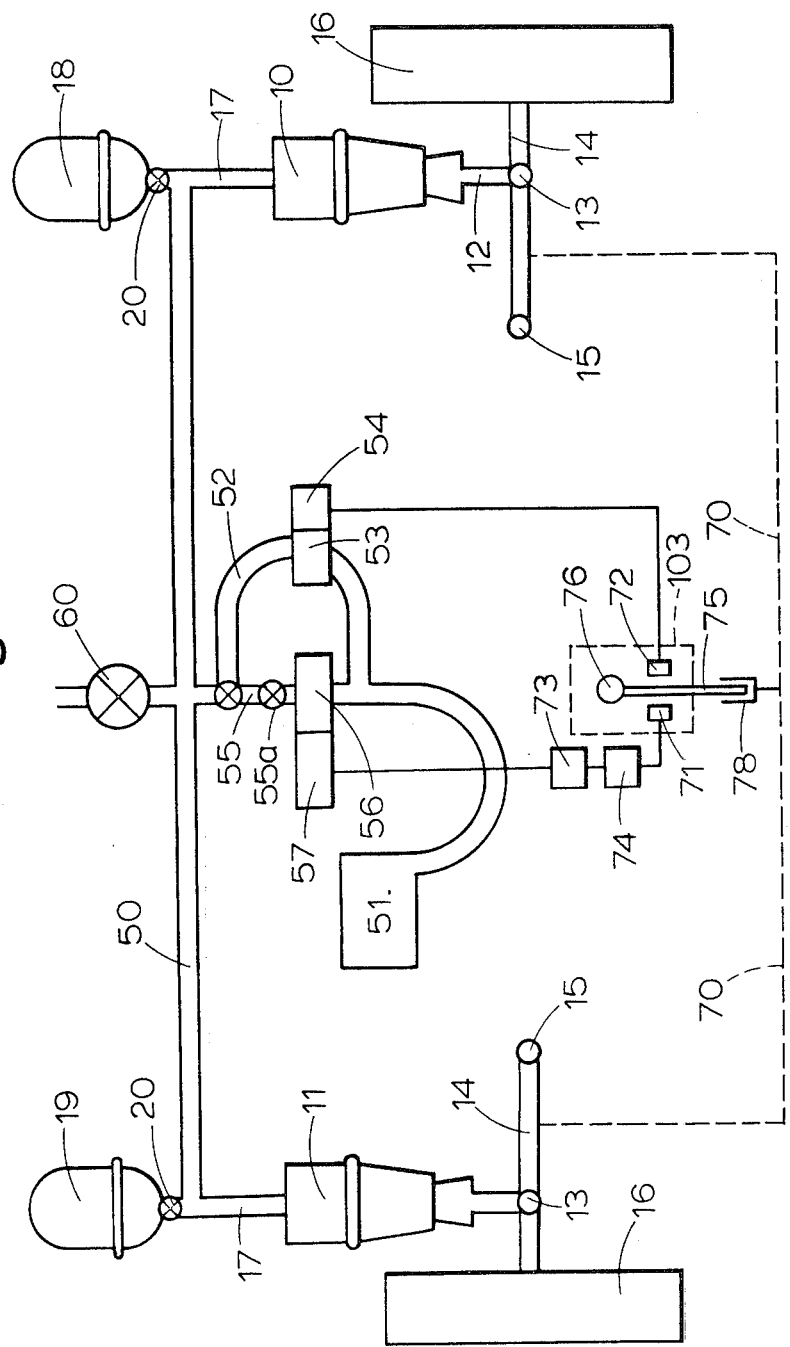
FIG. 1 is a diagrammatic view of a resilient suspension for the rear wheels of a four-wheeled vehicle and having provision for levelling.

Referring now to the drawings and first to FIG. 1, 10 and 11 represent hydraulic displacer units, an example of which will be described in greater detail with reference to FIG. 2.

The displacer units 10 and 11 are each associated by means of struts 12 and knuckle joints 13 (which may be ball or roller joints) with suspension arms 14. The suspension arms 14 are pivotally connected to the vehicle sprung structure (101, see FIG. 2) at 15 and at their opposite ends carry wheel hubs generally designated 14b. The suspension arms 14 may extend generally transversely of the vehicle or they may be semitrailing or trailing arms.

The hydraulic displacer units 10 and 11 are each connected by large bore pipes 17 to hydraulic accumulator springs 18 and 19 respectively. Damper valve means generally designated 20 control liquid flow in both directions to and from the hydraulic accumulator springs 18 and 19.

50 represents a transverse conduit pipe interconnecting the pipes 17 associated with the hydraulic displacer units 10 and 11 associated individually with the suspensions of the respective rear wheels.

51 represents a liquid reservoir connected to the transverse conduit by way of a branch connection 52. In the branch connection 52, there is a valve 53 which is biased to closure and which may be opened on operation of a solenoid 54 whereupon liquid may pass from the transverse conduit 50 to the reservior 51.

The reservoir 51 is connected by a further branch pipe 55 to the transverse conduit 50 and in the pipe 55 there is arranged a pump 56 driven by a motor 57 which may be selectively operated to effect removal of liquid from the reservoir 51 and into the transverse conduit 50 past a non-return valve 55a.

60 represents a filler valve through which the system may be charged with liquid.

For controlling the operation of the levelling system, so as to obtain raising or lowering of the rear of the vehicle, there is provided a delay mechanism according to this invention in conjunction with an electrical circuit and a differential compensating device. The compensation device is necessary since one rear wheel can be located higher than the other relative to the vehicle sprung structure due to ground inequalities, or to unequal loading.

Figure 2:
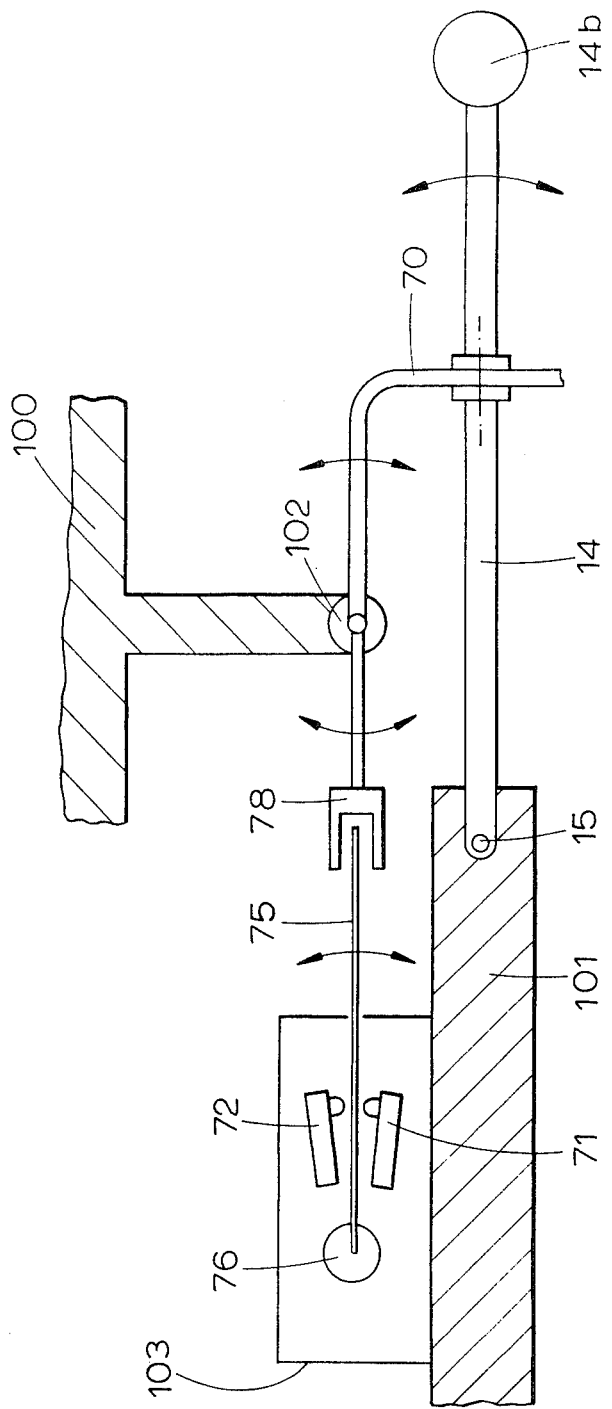
FIG. 2 is a detail view of a delay switch mechanism according to this invention connected for use in the suspension system of FIG. 1.

Such differential compensation as is required is effected by means of a torsion bar generally designated 70 connected between the wheel suspension arms 14 of the two rear wheels and 102 in FIG. 2 represents bushes mounted on the sprung structure 100. Deflection from a mean position of the central region of the torsion bar 70 is utilised to sense the mean deflection of the suspensions of the respective rear wheels, and to relate this mean deflection to the sprung structure of the vehicle.

More specifically the central region of the torsion bar is connected to effect, in dependence upon the sense or direction of deflection of its central region from a mean position, closure of a selected one of a pair of electrical trigger switches 71 and 72 forming part of a time delay mechansim 103 according to this invention.

Referring to FIG. 2 the time delay mechanism 103 illustrated diagrammatically, comprises a spring leaf 75 pivotally mounted at one end where a rotary damper 76, suitably an hydraulic damper, is arranged to damp oscillatory movements of the leaf 75 in both clockwise and anti-clockwise directions about its point. At its end remote from its pivot the leaf is associated with the mechanical component, in this case a fork 78 connected to move with the central region of the torsion bar 70. The limit switches 71 and 72 are located one on each side of the leaf 75.

Closure of the switch 71 effects operation through a relay 73 of the motor 57 driving the pump 56.

74 in FIG. 1 represents a switch actuated by the driver, preferably by operation of the main ignition switch of the vehicle, the arrangement being such that relay 75 can only be operated when the ignition switch is ON.

Closure of the trigger switch 72 effects operation of the solenoid 54 to open the valve 53 which is otherwise biased to closure.

In order to prevent undesirable operation of the levelling system during normal working of the suspension while the vehicle is in motion, the torsion bar 70 is connected by the fork 78 to the leaf 75.

As the central region of the torsion bar is deflected this rotary movement is transmitted by the fork 78 to the leaf spring 75 which flexes, and tends to turn about its pivot axis under a delay imposed by the rotary damper 76. However, if deflection of the central region of the torsion bar 70 is sufficiently large and prolonged one or other of the switches 71 or 72 will be actuated by abutment with the leaf 75.

Preferably the length of the arm 75 and the location of the fork or the switches is adjustable so that fine tuning may be obtained and the desired time delay imparted before the levelling system is actuated to raise or lower the suspension.

In all cases however, the arrangement is such that a predetermined time delay may be imposed before either of the trigger switches 71 or 72 can be operated consequent upon deflection of the central region of the torsion bar 70 from a predetermined mean position.

I claim:

1. A delay mechanism in combination with two electrical limit switches for controlling the operation of an electric circuit in dependence upon the movement of a mechanical component, the delay mechanism comprising: an elongate flexible element mounted for oscillatory movement about a pivot axis, a rotary damper device acting on the flexible element and arranged to damp said oscillaroty motion in both clockwise and anticlockwise directions, the flexible element being located adjacent the mechanical component and spaced a predetermined distance from the pivot axis to cooperate with the mechanical component so that movement thereof is transmitted to the flexible element, and the electrical limit switches being located, one on each side of the flexible element at locations spaced from the pivot axis a distance less than said predetermined distance so that on movement of the mechanical component the flexible element is resiliently deformed so that one or other of the limit switches is operated only when movement of the mechanical componenet exceeds a predetermined extent and for a predetermined duration of time.

2. A mechanism according to claim 1, wherein the flexible element comprises:
    a metal leaf spring adapted to be resiliently deformed in bending.

3. A delay mechanism according to claim 2 wherein said mechanical component is part of a vehicle wheel suspension levelling system, and wherein the mechanism is attached to the sprung structure of the vehicle and the flexible element has a region remote from the pivot axis associated with a movable component of the wheel suspension system of the vehicle.

4. A delay mechanism according to claim 3, wherein the electric circuit includes an electric motor driving a pump which transfers fluid from a reservoir into hydraulic systems associated with the respective rear wheel suspensions to increase the spatial relationship between the rear wheels and the vehicle sprung structure, and a solenoid for opening a relief valve means allowing hydraulic fluid to return to the reservoir and one of said switches activates the electric motor and the other switch activates the solenoid.

5. A delay mechanism according to claim 1, wherein the mechanical component is associated with a vehicle suspension system so that actuation of one of the limit switches by the flexible element effects operation of an electric circuit to control means for raising vehicle sprung structure relative to vehicle unsprung structure and actuation of the other limit switch effects operation of the circuit to control means lowering the vehicle sprung structure relative to the vehicle unsprung structure.

6. A delay mechanism for controlling the operation of an electric circuit according to movement of a mechanical component, comprising:
    a mounting means for supporting the delay mechanism;
    a rotary damper element mounted on said mounting means;
    a pivotable elongate flexible element attached to said rotary damper element in a manner such that a means connected to the mechanical component can effect pivotal movement of said flexible element about a pivot axis, said damper element delaying said flexible element pivotal movement for a predetermined time; and contact means on said mounting means for activating the electric circuit, said contact means being located adjacent said flexible element and spaced therefrom a predetermined distance to be actuated by said flexible element after said predetermined time so that the electric circuit is activated after the mechanical component has moved a prescribed distance for said predetermined time thereby preventing activation of the electric circuit for movements of the mechanical component which are less than said prescribed distance or occur for less than said predetermined time.

7. A mechanism according to claim 1, wherein the flexible element comprises a thin torsion spring adapted to be resiliently deformed in torsion.

* * * * *